United States Patent
Cassiano Gaspar et al.

(10) Patent No.: US 9,227,873 B2
(45) Date of Patent: Jan. 5, 2016

(54) MATERIAL BASED ON ALUMINA, WITH A MULTISCALE STRUCTURE, COMPRISING AN ALUMINIUM PHOSPHATE BINDER WITH GOOD MECHANICAL STRENGTH, AND PROCESS FOR ITS PREPARATION

(71) Applicant: IFP ENERGIES NOUVELLES, Rueil-Malmaison (FR)

(72) Inventors: Stefania Cassiano Gaspar, Oullins (FR); Delphine Bazer-Bachi, Irigny (FR); Loic Rouleau, Charly (FR); Eric Lecolier, Chaville (FR); Jerome Chevalier, Rillieux la Pape (FR); Yves Jorand, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 18 days.

(21) Appl. No.: 14/365,322

(22) PCT Filed: Nov. 27, 2012

(86) PCT No.: PCT/FR2012/000491
§ 371 (c)(1),
(2) Date: Jun. 13, 2014

(87) PCT Pub. No.: WO2013/088000
PCT Pub. Date: Jun. 20, 2013

(65) Prior Publication Data
US 2014/0377561 A1 Dec. 25, 2014

(30) Foreign Application Priority Data
Dec. 14, 2011 (FR) .................................... 11 03858

(51) Int. Cl.
| | | |
|---|---|---|
| *C04B 35/111* | (2006.01) | |
| *C01F 7/02* | (2006.01) | |
| *C04B 28/34* | (2006.01) | |
| *C04B 35/626* | (2006.01) | |
| *C04B 35/63* | (2006.01) | |
| *B28B 3/20* | (2006.01) | |
| *B28B 11/24* | (2006.01) | |
| *C01F 7/44* | (2006.01) | |
| *C04B 111/00* | (2006.01) | |

(52) U.S. Cl.
CPC ................ *C04B 35/111* (2013.01); *B28B 3/20* (2013.01); *B28B 11/243* (2013.01); *C01F 7/02* (2013.01); *C01F 7/441* (2013.01); *C04B 28/342* (2013.01); *C04B 35/62655* (2013.01); *C04B 35/62695* (2013.01); *C04B 35/6309* (2013.01); *C01P 2004/32* (2013.01); *C01P 2004/51* (2013.01); *C01P 2004/61* (2013.01); *C01P 2006/12* (2013.01); *C01P 2006/14* (2013.01); *C01P 2006/16* (2013.01); *C04B 2111/0081* (2013.01); *C04B 2235/3218* (2013.01); *C04B 2235/447* (2013.01); *C04B 2235/5409* (2013.01); *C04B 2235/5427* (2013.01); *C04B 2235/5436* (2013.01); *C04B 2235/5445* (2013.01); *C04B 2235/5472* (2013.01); *C04B 2235/6021* (2013.01); *C04B 2235/95* (2013.01); *Y10T 428/2982* (2015.01)

(58) Field of Classification Search
CPC ................ C04B 35/111; C04B 28/342; C04B 35/62655; C04B 35/62695; C04B 35/6309; C04B 2111/0081; C04B 2235/3218; C04B 2235/447; C04B 2235/5409; C04B 2235/5427; C04B 2235/5426; C04B 2235/5445; Y10T 428/2982; B32B 3/20; B32B 11/243; C01F 7/441; C01F 7/02
USPC ............................................ 428/402; 264/234
See application file for complete search history.

(56) References Cited

U.S. PATENT DOCUMENTS

| | | | | |
|---|---|---|---|---|
| 3,223,537 A | * | 12/1965 | Wiegert et al. | 501/84 |
| 6,780,817 B1 | * | 8/2004 | Koyama et al. | 502/314 |
| 8,562,940 B2 | * | 10/2013 | Rouleau et al. | 423/625 |

OTHER PUBLICATIONS

S.E. Grover et al.: Low-temperature synthesis of berlinite-bonded alumina ceramics, Energy Citations Database, No. ANL/ET/CP-97994, Aug. 3, 1999, OSTI, USA.*
International Search Report dated Mar. 7, 2013 issued in corresponding PCT/FR2012/000491 application (pp. 1-2).
S.E. Grover et al., "Low-Temperature Synthesis of Berlinite-Bonded Alumina Ceramics", Energy Citations Database (ECD)—Retrieved from the Internet: URL:http://www.osti.gov/energycitations/product.biblio.jsp?osti_id=11185-XP002678173 (Aug. 3, 1999).

* cited by examiner

*Primary Examiner* — Leszek Kiliman
(74) *Attorney, Agent, or Firm* — Millen White Zelano and Branigan, PC; Csaba Henter; Anthony Zelano

(57) ABSTRACT

A material is described in the form of a millimetric article constituted by coarse alumina particles with a median diameter in the range 10 to 200 μm, said coarse particles being at a distance, from one interface to another, of less than 10 μm, fine alumina particles with a median diameter in the range 0.5 to 10 μm, said fine particles being at a distance, from one interface to another, of less than 5 μm and being located in the space between the coarse particles, and a binder constituted by aluminium phosphate, said binder being located in the space between said fine and coarse particles, said material having a mesoporous volume, measured by mercury porosimetry, in the range 0.2 to 2 mL/g, a macroporous volume, measured by mercury porosimetry, in the range 0.05 to 0.2 mL/g and a BET specific surface area in the range 80 to 350 m²/g.

16 Claims, No Drawings

MATERIAL BASED ON ALUMINA, WITH A MULTISCALE STRUCTURE, COMPRISING AN ALUMINIUM PHOSPHATE BINDER WITH GOOD MECHANICAL STRENGTH, AND PROCESS FOR ITS PREPARATION

FIELD OF THE INVENTION

The present invention relates to the field of materials based on alumina, in the form of a millimetric article, which is porous and has good mechanical strength. More precisely, it relates to a material with a multiscale structure resulting from a hierarchical collection of fine and coarse particles, preferably alumina-based spherical, micrometric and porous, and a binder constituted by aluminium phosphate, as well as to a process for its preparation.

PRIOR ART

Materials based on alumina constituted by a maximum of a single class of particles assembled together by a binder into the form of a porous millimetric article have been widely described in the prior art such as, for example, in patent U.S. Pat. No. 6,780,817. The particles which constitute such materials are alumina particles or particles originating from solid alumina precursors (aluminium oxides, oxyhydroxides or hydroxides), and in that case are not dispersed during the shaping process and are thus present within the final material. The binder used is also a solid alumina precursor, but with a better dispersion capacity during the shaping process than that of the particles. The textural properties (BET specific surface area, mesoporous and macroporous volume, mesopore diameter) of the material are directly linked to the textural properties of the particles and the binder employed in the preparation of said materials. Further, the mesoporous and macroporous volumes are influenced by the quantity of particles and of binder. In fact, a large macroporous volume can be obtained if the quantity of binder is low and in this case the mechanical properties of the material are severely degraded. An improvement in the mechanical behaviour may be sought by increasing the binder content, which involves a reduction in the macroporous volume but also a reduction in the quantity of particles in the material. In that case, the mesoporosity of the material may be degraded because of the small amount of porous particles, and as a consequence, the mesoporosity of the material obtained from said particles is lower. The characteristics of the mesopores are attributed to the organization of the alumina crystallites, which depends on the preparation process and in particular on the synthesis of the alumina precursor or the shaping of the millimetric article. Improving the textural properties of said particles, such as increasing the specific surface area, the mesoporous volume or the mesopore size may be sought and obtained by synthesis or post-synthesis treatment. However, those characteristics are partially degraded during shaping.

Aim and Advantage of the Invention

The present invention relates to a material based on alumina, in the form of a millimetric article, with a multiscale structure, which is porous and has good mechanical strength, which results from a hierarchical collection of fine and coarse micrometric, porous particles based on alumina and a binder constituted by aluminium phosphate, providing said material with cohesion, and to a process for its preparation.

The advantage of the invention lies in its hierarchical organization of fine and coarse porous micrometric particles of alumina, which means that the number of particles in the material can be maximized and, as a consequence, the mesoporous volume of said material can be increased. The hierarchical organization can also be used to minimize the quantity of binder, since the space between the coarse particles is filled by the fine particles and as a consequence, the quantity of binder necessary to provide cohesion of the material is minimized. This binder can be used to ensure a minimal macroporous volume which is, however, sufficient for accessibility to the pores of said micrometric particles. On the other hand, the hierarchical organization provides suitable mechanical properties. Further, an improvement in those properties can be obtained by using a specific binder.

In particular, in one aspect, the present invention concerns a material in the form of a millimetric article constituted by coarse alumina particles with a median diameter in the range 10 to 200 μm, said coarse particles being at a distance, from one interface to another, of less than 10 μm, fine alumina particles with a median diameter in the range 0.5 to 10 μm, said fine particles being at a distance, from one interface to another, of less than 5 μm and being located in the space between the coarse particles, and a binder constituted by aluminium phosphate, said binder being located in the space between said fine and coarse particles, said material having a mesoporous volume, measured by mercury porosimetry, in the range 0.2 to 2 mL/g, a macroporous volume, measured by mercury porosimetry, in the range 0.05 to 0.2 mL/g and a BET specific surface area in the range 80 to 350 m$^2$/g.

In a further aspect, the present invention concerns a process for preparing said material, which comprises at least the following steps:

a) mixing 10% to 60% by weight of fine alumina particles with a median diameter in the range 0.5 to 10 μm and 40% to 90% by weight of coarse alumina particles with a median diameter in the range 10 to 200 μm, 5% to 50% by weight of a solid alumina precursor, the percentages of the fine and coarse particles of alumina being expressed with respect to the total quantity of micrometric particles, and the percentage of solid alumina precursor being expressed with respect to the total quantity of solid, and phosphoric acid in solution in proportions such that the P/Al molar ratio is in the range 0.2 to 1.2, said coarse particles and fine particles of alumina, designated by the term micrometric particles, having a mesoporous volume in the range 0.2 to 2.5 mL/g, and a median mesopore diameter in the range 7 to 25 nm;

b) shaping the mixture obtained from step a);

c) drying the green material obtained at the end of step b); and d) calcining the dried material obtained from step c).

One advantage of the present invention is to provide a material having a maximized proportion of fine and coarse porous particles due to the hierarchical organization of said particles in the material, and thus of providing a material having a very broad textural range, in particular a mesoporous volume which may reach a value of 2 mL/g, much greater than the mesoporous volume values generally observed for materials based on alumina constituted by a maximum of a single class of particles assembled together by a binder of the prior art.

Another advantage of the present invention is to provide a material having increased mechanical strength properties. This is due to the combined effect of the hierarchical organization of the fine and coarse particles of alumina of the material of the invention and the cohesion of said material provided by the presence of a specific binder. In particular, the material of the invention has a maximized lateral crush strength which may be up to very high force values, up to 100

N for a material of the invention in a cylindrical shape, with a diameter of 2 mm and a length of 4 mm, which are much higher force values than those observed for alumina based materials constituted by a single class of particles assembled together by a binder of the prior art.

Another advantage of the present invention is also the provision of a preparation process which can be used to obtain said material with increased mechanical strength properties by mixing, in a step a), micrometric particles of alumina with a solid alumina precursor and with a solution of phosphoric acid in proportions such that the specific P/Al molar ratio results in the in situ generation of a specific binder constituted by aluminium phosphate at the end of a step d) for calcining the dried and shaped material.

Another advantage of the present invention is also the provision of a preparation process that can produce:
  good sliding of the micrometric alumina particles with respect to each other during mixing step a), which on the one hand limits degradation of the particles, and thus can maintain a high porosity in the material, and on the other hand limits the generation of micrometric defects in the mixture, thereby improving its mechanical strength;
  good flow of the mixture obtained in step a) during step b), which limits the generation of geometrical defects and micrometric defects on the surface of the green material, thereby improving the appearance and mechanical strength of the material in the form of the millimetric article obtained in accordance with the invention;
  the formation of defects linked to densification of the binder during steps c) and d) is minimized due to it being located in the fine space between the micrometric alumina particles, which improves the mechanical strength of the material in the form of the millimetric article obtained in accordance with the invention.

DESCRIPTION OF THE INVENTION

The present invention concerns a material in the form of a millimetric article constituted by coarse alumina particles with a median diameter in the range 10 to 200 µm, said coarse particles being at a distance, from one interface to another, of less than 10 µm, fine alumina particles with a median diameter in the range 0.5 to 10 µm, said fine particles being at a distance, from one interface to another, of less than 5 µm and being located in the space between the coarse particles, and a binder constituted by aluminium phosphate, said binder being located in the space between said fine and coarse particles, said material having a mesoporous volume, measured by mercury porosimetry, in the range 0.2 to 2 mL/g, a macroporous volume, measured by mercury porosimetry, in the range 0.05 to 0.2 mL/g and a BET specific surface area in the range 80 to 350 m$^2$/g.

Throughout the remainder of the text, the term "mesoporous volume" means the volume of pores with a diameter in the range 3.6 to 50 nm. In accordance with the invention, the mesoporous volume is measured by mercury porosimetry using the method described below. More particularly, the term "mesoporous volume" means a pore volume corresponding to the volume of mercury which enters into pores with a diameter in the range 3.6 to 50 nm.

Throughout the remainder of the text, the term "macroporous volume" means the volume of pores with a diameter in the range 50 to 7000 nm. In accordance with the invention, the macroporous volume is measured by measured by mercury porosimetry using the method described below. More particularly, the term "macroporous volume" means a pore volume corresponding to the volume of mercury which enters into pores with a diameter in the range 50 to 7000 nm.

Throughout the remainder of the text, the term "volume measured by mercury porosimetry" means the volume measured using the mercury penetration technique in which the Kelvin-Washburn law is applied, which provides the relationship between the pressure, the diameter of the smallest pore into which the mercury penetrates at said pressure, the wetting angle and the surface tension in accordance with the formula: $P=(4\gamma\cos\theta)d$, in which $\gamma$ is the surface tension, $\theta$ is the wetting angle of mercury with the material, d represents the pore diameter, and P the pressure. Mercury porosimetry is carried out in accordance with ASTM standard D4284-83, using a surface tension of 480 dyne/cm and a contact angle of 140°. The wetting angle was taken to be 140° in compliance with the recommendations in the work entitled "Techniques de l'Ingénieur, traité analyse and caractérisation [Engineering Techniques, Analytical Treatment and Characterization] P 1050-5, by Jean Charpin and Bernard Rasneur".

Throughout the remainder of the text, the term "BET specific surface area" means a specific surface area determined by nitrogen adsorption in accordance with the ASTM standard D 3663-78 established from the BET (Brunauer-Emmett-Teller) method described in the periodical "The Journal of the American Society", 60, 309 (1938).

The coarse particles and the fine particles of alumina which constitute the material of the invention are micrometric particles because of their dimensions.

The material of the present invention is advantageously constituted by the hierarchical organization of fine and coarse micrometric porous particles of alumina.

The term "micrometric particles" as used throughout the text means the ensemble of coarse and fine particles. The total quantity of micrometric particles is thus the sum of the coarse and fine alumina particles.

Said micrometric particles which constitute the material of the invention are transition aluminas. In particular, the micrometric alumina particles are transition aluminas selected from chi, kappa, rho, eta, theta, gamma and delta alumina, used alone or as a mixture; preferably, the transition alumina is gamma alumina.

The fine and coarse particles or micrometric particles which constitute the material of the present invention are advantageously porous particles. Preferably, said particles are rounded in shape and more preferably are spherical in shape.

Said fine and coarse particles are advantageously agglomerates of nanometric crystallites of alumina. These crystallites are in the form of flakes, fibres or "blocks" the dimensions of which are advantageously in the range 2 to 150 nm, preferably in the range 4 to 150 nm and more preferably in the range 4 to 100 nm.

Alumina crystallites are the elementary entities which constitute the micrometric particles. The inter-crystallite space is responsible for the presence of the mesoporosity within said particles.

The size of the crystallite agglomerates which constitute the micrometric particles is analysed by scanning electron microscopy (SEM). In particular, the mean dimension of the crystallite agglomerates which constitute the micrometric particles is determined from scanning electron microscope images (SEM) of the material of the invention with the aid of SMile View software. The SEM images have to be produced with the material in fracture mode and with a secondary electron detector.

In accordance with the invention, the coarse alumina particles constituting the material of the invention have a median diameter in the range 10 to 200 µm, preferably in the range 10 to 100 µm and more preferably in the range 10 to 80 µm. The term "median diameter" means the D50, i.e. the diameter of the equivalent disk for which 50% by number of said coarse particles have a dimension smaller than said diameter.

The grain size distribution of said coarse alumina particles in the material of the invention is represented by the dimension DX, defined as being the diameter of the equivalent disk for which X% by number of said coarse particles has a dimension smaller than said diameter. More precisely, the grain size distribution of said coarse particles is advantageously represented by the three dimensions D10, D50 and D90.

Said material of the invention advantageously has a grain size distribution of said coarse alumina particles in said material for which the D10 diameter is at most 3 times smaller than the median diameter D50 and preferably at most 2 times smaller than the median diameter D50 and for which the D90 diameter is at most 3 times higher than the median diameter D50 and preferably at most 2 times higher than the median diameter D50.

The diameter of the coarse particles is determined in the material of the invention from scanning electron microscope (SEM) images of the material of the invention on a polished section, with the aid of SMile View software. The median diameter is calculated from the mean of the diameters determined using a number of measurements which the skilled person judges to be necessary and sufficient, preferably over at least 200 measurements.

In accordance with the invention, said coarse particles are at a distance from one interface to another of less than 10 µm, preferably less than 8 µm, and more preferably less than 6 µm.

The distance between the interface of one coarse particle and the interface of the nearest coarse particle is determined from scanning electron microscope (SEM) images of the material of the invention, on a polished section, using SMile View software. The measurements are carried out using a number of measurements which the skilled person judges to be necessary and sufficient, preferably over 50 images in order to determine a mean distance from one interface to another.

Said coarse particles advantageously have a median diameter of less than $\frac{1}{10}^{th}$ the mean diameter of the smallest dimension of the material of the invention, preferably less than $\frac{1}{50}^{th}$ of the mean diameter of the smallest dimension of said material, in order to ensure complete filling of the space in said material.

The coarse particles constituting the material of the invention may advantageously be composed of two populations of particles having distinct median diameters.

Said coarse particles may optionally comprise a proportion of particles, known as "smaller coarse" particles having a median diameter in the range 10 to 60 µm and preferably in the range 15 to 30 µm and a proportion of particles known as "larger coarse" particles with a median diameter in the range 60 to 200 µm, preferably in the range 100 to 180 µm.

In the case in which said coarse particles are composed of "smaller coarse" particles and of "larger coarse" particles, said material of the invention advantageously has a grain size distribution of said "smaller coarse" particles of alumina within said material for which the D10 diameter is at most 3 times smaller than the median diameter D50 and preferably at most 2 times smaller than the median diameter D50 and for which the D90 diameter is at most 3 times higher than the median diameter D50 and preferably at most 2 times higher than the median diameter D50, and a grain size distribution of said "larger coarse" particles of alumina within said material for which the D10 diameter is at most 3 times smaller than the D50 median diameter and preferably at most 2 times smaller than the median diameter D50 and for which the D90 diameter is at most 3 times higher than the median diameter D50 and preferably at most 2 times higher than the median diameter D50.

In accordance with the invention, the fine particles constituting the material of the invention have a median diameter in the range 0.5 to 10 µm, preferably in the range 0.5 to 6 µm and more preferably in the range 0.5 to 3 µm. The term "median diameter" means the D50, i.e. the diameter of the equivalent disk for which 50% by number of said fine particles have a dimension smaller than said diameter.

The distribution of the grain sizes of said fine alumina particles in the material of the invention is represented by the dimension DX, defined as being the diameter of the equivalent disk for which X% by number of said fine particles have a dimension smaller than said diameter. More precisely, the grain size distribution of said fine particles is advantageously represented by the three dimensions D10, D50 and D90.

Said material of the invention advantageously has a grain size distribution of said fine alumina particles in said material for which the D10 diameter is at most 3 times smaller than the median diameter D50 and preferably at most 2 times smaller than the median diameter D50 and for which the D90 diameter is at most 3 times higher than the median diameter D50 and preferably at most 2 times higher than the median diameter D50.

The diameter of the fine particles is determined in the material of the invention from scanning electron microscope (SEM) images of the material of the invention on a polished section with the aid of SMile View software. The median diameter is calculated from the mean of the diameters determined using a number of measurements which the skilled person judges to be necessary and sufficient, preferably over at least 200 measurements.

In accordance with the invention, said fine particles are at a distance from one interface to another by less than 5 µm, preferably less than 3 µm, and more preferably less than 2 µm.

The distance between the interface of one fine particle and the interface of the nearest fine particle is determined from scanning electron microscope (SEM) images of the material of the invention, on a polished section, using SMile View software. The measurements are carried out using a number of measurements which the skilled person judges to be necessary and sufficient, preferably over 50 images in order to determine a mean distance from one interface to another.

Said fine particles advantageously have a median diameter of less than $\frac{1}{5}^{th}$ the mean diameter of the coarse particles and preferably a median diameter of less than $\frac{1}{10}^{th}$ the median diameter of the coarse particles. This allows for filling of the space between said coarse particles, said fine particles being located in the space between said coarse particles.

In addition, the proportion of said fine particles is determined such that the space between said coarse particles is filled.

The proportions of the fine and coarse alumina particles constituting the material of the invention are expressed as the surface percentages with respect to the total surface area of the SEM image of the material of the invention, so as to indicate the surface area which the fine and coarse particles occupy within the material as well as the proportion of smaller coarse particles with a median diameter in the range 10 to 60 µm. The surface percentages of the micrometric particles are determined from SEM image analysis of the material of the invention using a polished section. The resolution of the scanning electron microscope (SEM) is advantageously adapted to the median diameter of said micrometric particles so as to have an image which is representative of the whole of the material of the invention.

The surface area occupied by the fine particles is determined as follows: the diameter of the totality of the fine particles is measured using SMile View software in order to calculate the surface area occupied by each of said fine particles. The sum of each of the surface areas occupied by each of said fine particles corresponds to the total surface area occupied by all of said fine particles in the SEM image.

The surface area occupied by the coarse particles is determined using GIMP and Analysis software as follows: the borders of each of the coarse particles are defined using GIMP software. The surface area occupied by all of said coarse particles is then expressed as a percentage using Analysis software.

The proportion of fine and coarse particles which occupy the surface of the SEM image of the material of the invention is expressed as a surface percentage with respect to the total surface area of the SEM image of the material of the invention. It is calculated using the formula: (surface area occupied by the fine or the coarse particles/total surface area of SEM image)×100. The surface percentages are determined for the number of images that the skilled person judges to be necessary and sufficient, preferably over 10 images.

The surface percentage of the fine particles with respect to the total surface area of the SEM image of the material of the invention is advantageously in the range 5% to 55%, preferably in the range 10% to 45% and more preferably in the range 10% to 30%. The surface percentage of the coarse particles is advantageously in the range 35% to 85%, preferably in the range 45% to 80% and more preferably in the range 60% to 80% with respect to the total surface area of the SEM image of the material of the invention. The complement of the surface fraction, i.e. the sum of the surface percentages of the fine and coarse particles subtracted from 100%, corresponds to the surface percentage occupied by the binder constituted by aluminium phosphate, and the residual void. The presence of residual void in the SEM image, i.e. the unfilled space, is linked to the existence of a macroporous volume in the material.

In accordance with the invention, said fine particles are located in the space between the coarse particles. This assembly of fine and coarse particles is at the origin of the hierarchical organization of said micrometric particles in the material. Said material of the invention advantageously has a hierarchical organization.

The hierarchical organization of said micrometric particles in said material results in a highly extensive textural range, in particular a mesoporous volume, measured by mercury porosimetry on said material, in the range 0.2 to 2 mL/g.

In accordance with the invention, a binder constituted by aluminium phosphate is located in the space between the fine and coarse particles. Preferably, said fine particles fill the space between the coarse particles and said binder fills the residual space between the fine and the coarse particles and the residual space between the fine particles.

Said binder fills the space between said micrometric particles so as to ensure cohesion of the material of the invention and, as a consequence, in order to minimize the residual void, i.e. the unfilled space between said micrometric particles. The existence of residual void is responsible for the presence of a macroporous volume in the material.

The binder present in the space between the micrometric particles can be used to minimize the macroporous volume in the material of the invention such that said macroporous volume of said material is in the range 0.05 to 0.2 mL/g, preferably in the range 0.07 to 0.17 mL/g, and more preferably in the range 0.1 to 0.15 mL/g.

Further, the binder must not perturb the hierarchical organization of fine and coarse particles, i.e. the binder must not space the micrometric particles further apart from each other.

Thus, said binder can be used to maintain a distance from one interface to another between the fine particles of less than 5 µm, preferably less than 3 µm, and more preferably less than 2 µm, and a distance from one interface to another between the coarse particles of less than 10 µm, preferably less than 8 µm and more preferably less than 6 µm. Thus, cohesion of the micrometric particles is ensured by the presence of said binder constituted by aluminium phosphate.

The location of the phosphorus deriving from the binder constituted by aluminium phosphate in the material of the invention is obtained by means of phosphorus P mapping carried out using scanning electron microscopy (SEM) coupled with EDS (Energy Dispersive Spectroscopy) microanalysis (SEM-EDS). The material is analysed on a polished section with a backscattered electron detector.

In the material of the invention, said binder is advantageously in the form of particles with a mean dimension of less than 1 µm. The size of the particles constituting the binder may advantageously be measured in the material of the invention by SEM image analysis with the aid of SMile View software. The SEM images must be produced on the material of the invention in fracture mode and with a secondary electron detector.

In accordance with the invention, said material has a mesoporous volume, measured by mercury porosimetry, in the range 0.2 to 2 mL/g, preferably in the range 0.2 to 1.5 mL/g and more preferably in the range 0.2 to 1 mL/g.

In accordance with the invention, said material has a macroporous volume, measured by mercury porosimetry, in the range 0.05 to 0.2 mL/g, preferably in the range 0.07 to 0.17 mL/g and more preferably in the range 0.1 to 0.15 mL/g.

Preferably, said material has a median mesopore diameter, measured by mercury porosimetry, in the range 8 to 25 nm, preferably in the range 10 to 25 nm, more preferably in the range 10 to 23 nm.

In accordance with the invention, said material has a BET specific surface area in the range 80 to 350 $m^2/g$, preferably in the range 80 to 250 $m^2/g$, more preferably in the range 80 to 200 $m^2/g$.

In accordance with the invention, said material is in the form of a millimetric article. Preferably, the mean diameter of the smallest dimension of the material of the invention is advantageously in the range 0.5 to 10 mm, preferably in the range 0.7 to 5 mm, more preferably in the range 1.0 to 4.0 mm. the dimensions of the millimetric article may be obtained with any measuring tool adapted to the dimensions of said material, in particular with callipers.

Said material is advantageously in the form of a granule or extrudate, preferably in the form of an extrudate.

The material of the invention thus has maximized proportions of porous micrometric particles due to this hierarchical organization, resulting in a porous material with good mechanical strength.

The material of the present invention has excellent mechanical strength properties. This is due to the combined effect of the hierarchical organization of the fine and coarse particles of alumina of the material of the invention and of the cohesion of said material ensured by the presence of a specific binder. In particular, the material of the invention has a lateral crush strength determined by the average crush strength test (ACS) which is advantageously in the range 50 to 100 N, preferably in the range 60 to 100 N and more preferably in the range 80 to 100 N, expressed as the force in the case of the materials of the invention in the form of granules; and a lateral crush strength advantageously in the range 1 to 2.5 daN/mm, preferably in the range 1 to 2.3 daN/mm and more preferably in the range 1 to 2 daN/mm, expressed as the force per unit length in the case of the materials of the invention in the form of extrudates.

The term "lateral crush strength" means the mechanical strength of the material of the invention determined by the average crush strength test (ACS). It is a standard test (ASTM standard D4179-01) which consists of subjecting a material in the form of a millimetric article, such as a granule or extrudate, to a compressive force generating rupture. This test is thus a measurement of the tensile strength of the material. The analysis is repeated for a certain number of solids taken individually, typically over a number of solids in the range 10 to 200. The mean of the lateral rupture forces measured constitutes the mean ACS which in the case of granules is expressed in units of force (N) and in the case of extrudates is expressed in units of force per unit length (daN/mm).

Preparation Process

In a further aspect, the present invention concerns a process for the preparation of said material, comprising at least the following steps:

a) mixing 10% to 60% by weight of fine alumina particles with a median diameter in the range 0.5 to 10 µm and 40% to 90% by weight of coarse alumina particles with a median diameter in the range 10 to 200 µm, 5% to 50% by weight of a solid alumina precursor, the percentages of the fine and coarse particles of alumina being expressed with respect to the total quantity of micrometric particles, and the percentage of solid alumina precursor being expressed with respect to the total quantity of solid, and phosphoric acid in solution in proportions such that the P/Al molar ratio is in the range 0.2 to 1.2, said coarse particles and fine particles of alumina, designated by the term micrometric particles, having a mesoporous volume in the range 0.2 to 2.5 mL/g, and a median mesopore diameter in the range 7 to 25 nm;

b) shaping the mixture obtained from step a);

c) drying the green material obtained at the end of step b); and d) calcining the dried material obtained from step c).

The coarse particles and the fine particles of alumina, together designated by the term "micrometric particles" used in mixing step a) of the preparation process are transition aluminas selected from chi, kappa, rho, eta, theta, gamma and delta alumina, used alone or as a mixture, preferably gamma alumina, or are advantageously solid precursors of alumina selected from hydrargillite, gibbsite, nordstrandite, bayerite, boehmite or pseudo-boehmite. In the case in which the micrometric particles are solid alumina precursors, said precursors must have low dispersibility in the acid solution introduced in mixing step a) of the preparation process, i.e. so that the median diameter of said micrometric particles is only slightly reduced during step a) and that the hierarchical organization of fine and coarse particles can be observed within the material obtained from preparation step d) using the characterization techniques described in detail above. In this case, at the end of calcining step d), a phase transformation takes place in order to obtain the transition aluminas in said material.

Throughout the description of the preparation process, the micrometric alumina particles used in mixing step a) of the preparation process are transition aluminas or solid alumina precursors which have low dispersibility in the phosphoric acid solution employed in said step a) of the preparation process, and which will be transformed into transition alumina at the end of calcining step d).

In mixing step a) of the preparation process of the invention, fine alumina particles with a median diameter in the range 0.5 to 10 µm are mixed with coarse alumina particles with a median diameter in the range 10 to 200 µm.

Preferably, said coarse alumina particles have a median diameter in the range 10 to 100 µm, preferably in the range 10 to 80 µm.

Said coarse particles mixed in step a) of the preparation process of the invention may advantageously be composed of two populations of particles with distinct median diameters.

Said coarse particles may optionally comprise a proportion of particles, termed "smaller coarse" particles with a median diameter in the range 10 to 60 µm, preferably in the range 15 to 30 µm, and a proportion of particles termed "larger coarse" particles with a median diameter in the range 60 to 200 µm, preferably in the range 100 to 180 µm.

Preferably, said fine alumina particles have a diameter in the range 0.5 to 6 µm, preferably in the range 0.5 to 3 µm.

Said micrometric alumina particles mixed in step a) of the preparation process are advantageously used in the powder form.

The size distribution of said micrometric alumina particles in the powders used in said mixing step a) is measured by laser diffraction granulometry based on the Mie diffraction theory (G. B. J. de Boer, C. de Weerd, D. Thoenes, H. W. J. Goossens, Part. Charact. 4 (1987) 14-19). The grain size distribution of micrometric alumina particles in powders is represented by the dimension DvX, defined as the diameter of the equivalent sphere for which X% by volume of said particles has a size smaller than said diameter. More precisely, the grain size distribution of said particles is represented by the three dimensions Dv10, Dv50 and Dv90. The term "median diameter" employed in the description of the preparation process of the invention designates the Dv50, i.e. the diameter of the equivalent sphere for which 50% by volume of said particles has a dimension smaller than said diameter.

The grain size distribution of the fine particles is such that the diameter Dv10 is at most 3 times smaller than the median diameter Dv50 and preferably at most 2 times smaller than the median diameter Dv50 and such that the Dv90 diameter is at most 3 times higher than the median diameter Dv50 and preferably at most 2 times higher than the median diameter Dv50.

The grain size distribution of the larger coarse particles and the grain size distribution of the smaller coarse particles is advantageously identical to the grain size distribution of the fine particles.

Thus, the grain size distribution of the fine particles is preferably monomodal, and the grain size distribution of the coarse particles may be monomodal or bimodal, in the case in which said coarse particles are composed of said smaller coarse particles and said larger coarse particles.

The textural properties of said micrometric alumina particles, such as the BET specific surface area, the mesoporous volume and the median mesopore diameter, are respectively determined by nitrogen adsorption and mercury porosimetry. The BET specific surface area, the mesoporous volume and the pore size distribution of the micrometric particles constituting the material of the invention may vary widely as a function of the process for preparing the alumina precursor used to prepare the micrometric particles, and the operating conditions.

Said micrometric particles advantageously have a BET specific surface area in the range 100 to 480 $m^2/g$, preferably in the range 120 to 300 $m^2/g$, and more preferably in the range 120 to 250 $m^2/g$.

In accordance with the invention, said micrometric particles have a mesoporous volume in the range 0.2 to 2.5 mL/g, preferably in the range 0.3 to 2.0 mL/g, and more preferably in the range 0.3 to 1.5 mL/g.

In accordance with the invention, said micrometric particles have a median mesopore diameter in the range 7 to 25 nm, preferably in the range 7 to 24 nm, and more preferably in the range 7.5 to 23 nm.

The proportions of fine and coarse particles introduced into the mixture of step a) is an essential criterion in the preparation process of the present invention, since said proportions define the compactness of the mixture of fine and coarse particles. Said proportions give rise to the hierarchical organization of fine and coarse particles within the material obtained at the end of said preparation process. More precisely, the proportions of fine and coarse particles are selected so as to have a mixture of fine and coarse particles which gives rise to satisfactory compactness. Said compactness of the mixture of fine and coarse particles is determined by a conventional settled packing density measurement (SPD). At the end of this measurement, it is possible to calculate the compactness (C) of the mixture of powders from the formula: C=SPD/Dg, where SPD is the settled packing density of the mixture of powders and Dg is the grain density of said mixture of powders. Starting from the compactness (C), it is possible to determine the porosity ($\epsilon$) of the mixture of powders, where $\epsilon=1-C$. The porosity provides information regarding the void volume between the fine and coarse particles, and as a consequence can be used to define the proportion of binder required to fill the space between said fine and coarse particles. This also means that the proportion of solid alumina precursor necessary to produce said proportion of binder can be defined.

In accordance with mixing step a) of the preparation process of the invention, 10% to 60%, preferably 15% to 35% by weight of fine alumina particles with a median diameter in the range 0.5 to 10 μm and 40% to 90%, preferably 65% to 85% by weight of coarse alumina particles with a median diameter in the range 10 to 200 μm are mixed, the percentages being expressed with respect to the total quantity of micrometric particles.

If the proportion of coarse particles is less than 40% by weight, the hierarchical organization of micrometric alumina particles will not be optimal given the large quantity of fine particles, and maximization of the proportion of micrometric alumina particles could not be obtained because of a less compact organization. Further, if the proportion of coarse particles is too high, and in particular more than 90% by weight, the quantity of fine particles will not be sufficient to fill the voids between the coarse particles, and the hierarchical organization of micrometric alumina particles will not be optimal because of a less compact organization.

Another essential criterion of the preparation process of the invention is the introduction into mixing step a) of a solid alumina precursor and an acid in solution to allow in situ generation of a binder constituted by aluminium phosphate after calcining step d) of the preparation process of the invention.

Further, the solid alumina precursor and the acid in solution must be introduced into said step a) in the proportions as claimed.

Generation of said binder constituted by aluminium phosphate necessitates a solid alumina precursor which, in the presence of the acid solution, is more reactive than the micrometric alumina particles also introduced into mixing step a) of the preparation process of the invention. In fact, the solid alumina precursor must be capable of being mainly dispersed or of mainly dissolving in the acid solution employed and of forming particles with a mean dimension of less than 1 μm between the micrometric particles. In particular, the micrometric alumina particles can only be slightly degraded in the presence of said acid solution, i.e. the median diameter of said alumina particles must be largely maintained in the presence of the acid in solution introduced during step a) of the preparation process of the invention.

The solid alumina precursor is advantageously selected from aluminium oxides, aluminium hydroxides and aluminium oxyhydroxides which are soluble or dispersible in the phosphoric acid solution, preferably from aluminium hydroxides and aluminium oxyhydroxides. Highly preferably, said solid alumina precursor is an aluminium oxyhydroxide, and still more preferably said alumina precursor is boehmite or pseudo-boehmite.

Said alumina precursor is advantageously in the form of a powder constituted by solid particles with a median diameter, determined by laser diffraction granulometry, in the range 9 to 80 μm, preferably in the range 10 to 60 μm and more preferably in the range 15 to 45 μm. The particles of solid alumina precursor are advantageously constituted by agglomerates of elementary units, termed crystallites, the dimensions of which are advantageously in the range 2 to 150 nm, preferably in the range 4 to 150 nm and more preferably in the range 4 to 100 nm, determined by transmission electron microscopy (TEM). The morphology of the crystallites, the dimensions and the manner in which the crystallites are organized principally depend on the synthesis pathway of the alumina precursor used to prepare said micrometric particles.

In accordance with step a) of the preparation process of the invention, the proportion of solid alumina precursor is in the range 5% to 50% by weight with respect to the total quantity of solid particles, preferably in the range 10% to 30% by weight, and more preferably in the range 15% to 25% by weight. The total quantity of solid particles is the sum of the micrometric particles (fine and coarse alumina particles) and the particles of solid alumina precursor.

If the quantity of solid alumina precursor is less than 5% by weight with respect to the total quantity of solid particles introduced, the quantity of binder constituted by aluminium phosphate which will be formed in situ after calcining step d.) will not be sufficient to ensure cohesion of the hierarchical organization of fine and coarse micrometric alumina particles. Further, if the quantity of solid alumina precursor is more than 50% by weight with respect to the total quantity of solid particles, the quantity of binder constituted by aluminium phosphate which will be formed in situ after calcining step d) will be greater than the quantity necessary for filling the residual voids between the micrometric particles and as a consequence, the micrometric particles will be dispersed in a non-organized manner within said binder and the proportion of micrometric particles present in the material finally obtained at the end of the preparation process of the invention will not be a maximum.

In accordance with step a) of the preparation process of the invention, phosphoric acid in solution is introduced into the mixture. Phosphoric acid is also known as orthophosphoric acid.

The role of the phosphoric acid solution is to promote the formation of an amorphous phase of aluminium phosphate from the reaction with the solid alumina precursor. In this manner, the particles of solid alumina precursor which initially have a median diameter of the order of ten microns, after the action of the acid and the mechanical energy supplied during step a) of the process for the preparation of the material of the invention, become an amorphous phase of aluminium phosphate with particles having a mean size of less than 1 µm.

In accordance with step a) of the preparation process of the invention, the phosphoric acid in solution is introduced in proportions such that the molar ratio P/Al is in the range 0.2 to 1.2. Preferably, the phosphoric acid in solution is introduced in proportions such that said ratio P/Al is in the range 0.4 to 1.0, and more preferably in the range 0.6 to 0.9. In the molar ratio P/Al, P derives from the phosphoric acid introduced and Al derives from the solid alumina precursor.

The specific P/Al molar ratio as claimed corresponds to a proportion of phosphoric acid such that the ratio of the mass of acid introduced to the mass of solid alumina precursor introduced is in the range 30% to 225% by weight, preferably in the range 59% to 160% by weight and more preferably in the range 89% to 125% by weight.

The use of a P/Al molar ratio in the range 0.2 to 1.2 in step a) of the preparation process of the invention means that the amorphous phase of aluminium phosphate can be formed at the end of the reaction between the phosphoric acid and the solid alumina precursor, but also, it means that partial dissolution is promoted and, to a minor extent, the micrometric alumina particles are promoted without affecting their size. This dissolution with a high acid ratio promotes the local formation of aluminium phosphate and as a consequence, after the calcining step d), can increase cohesion of the hierarchical organization of fine and coarse micrometric particles of alumina and thus of the material obtained by the preparation process of the invention.

In the case in which the mixture obtained from step a) is shaped by extrusion in step b), an organic binder may optionally be added in mixing step a). The presence of said organic binder facilitates shaping by extrusion. Said organic binder may advantageously be selected from methylcellulose, hydroxypropylmethylcellulose, hydroxyethylcellulose, carboxymethylcellulose and polyvinyl alcohol. The proportion of said organic binder is advantageously in the range 0 to 5% by weight, preferably in the range 0 to 3% by weight and more preferably in the range 0 to 1% by weight with respect to the total quantity of solid particles.

At the end of calcining step d) of the preparation process of the invention, said organic binder is decomposed, i.e. at the end of calcining step d), said organic binder is no longer present in the material of the invention.

The mixture of step a) of the preparation process of the invention is advantageously made in a single step or in two steps.

Carrying out said mixing step a) differs as a function of the shaping technique used in step b) of the preparation process of the invention.

In the case in which shaping step b) is carried out by extrusion, mixing step a) is preferably carried out in a single step. The micrometric alumina particles, the solid alumina precursor, the acid in solution and optional organic binder are mixed all at once using a batch mixer, preferably a cam blade or Z arm mixer, or using a twin screw measuring mixer. The mixing conditions are adjusted in a manner which is known to the skilled person and is intended to obtain a homogeneous, extrudable paste. The extrudability of the paste may advantageously be adjusted by adding water and acid in solution in order to obtain a paste which is suitable for carrying out step b) for shaping by extrusion.

In the case in which shaping step b) is carried out by wet granulation, mixing step a) is preferably carried out in two steps. Firstly, the fine and coarse micrometric alumina particles are advantageously dry mixed for a period in the range 1 to 5 min, preferably in the range 2 to 4 min. The mixture is preferably produced using a mixer such as a bowl granulator or a rotary drum. The solid alumina precursor and the acid in solution are then advantageously introduced into said dry mixture of micrometric alumina particles, in the form of a binder solution formed with the solid alumina precursor dispersed in said acid solution. The acid in solution and the solid alumina precursor dispersed in said acid solution are advantageously introduced in a second stage, with the aid of a spray nozzle, in order to ensure contact between the components of the mixture and to allow progressive agglomeration of the micrometric alumina particles during rotation of the bowl granulator or the rotary drum. Adding solid alumina precursor dispersed in the acid in solution in a second step means that shaping by wet granular growth during step b) for shaping by granulation is ensured. The shaping conditions are adjusted in a manner which is known to the skilled person and are intended to produce spherical granules of the desired size.

The mixture obtained from step a) is then shaped in accordance with step b) of the process for the preparation of the material of the invention. Shaping step b) can produce a green material.

The term "green material" means the shaped material which has not undergone heat treatment steps.

Said shaping step b) may advantageously be carried out by wet granulation or by extrusion. Preferably, said shaping step b) is carried out by extrusion in a manner which is known to the skilled person.

In this case, the mixture obtained from step a), i.e. the paste obtained from step a), advantageously passes through a die using, for example, a piston or a continuous double or single screw extruder. The diameter of the die is advantageously variable and is in the range 1 to 5 mm. The shape of the die, and as a consequence the shape of the micrometric solid obtained in the form of an extrudate, is advantageously cylindrical, trilobed, quadrilobed or even multilobed.

The green material obtained from step b) may thus be in the form of granules or extrudates, preferably in the form of extrudates.

The green material shaped in accordance with step b) of the preparation process of the invention then undergoes heat treatments in steps c) and d).

In accordance with step c) of the preparation process of the invention, the green material obtained at the end of step b) undergoes a drying step.

Said drying step c) is advantageously carried out using techniques which are known to the skilled person to evaporate the solvent of the acid solution present in the shaped green material obtained at the end of step b) in a controlled manner, and to carry out a first solidification of said material. Drying step c) may advantageously be carried out under vacuum or in air or in moist air, in one or more sub-steps under predetermined temperature, vacuum or gas conditions. Said drying step c) is advantageously carried out at a temperature in the range 40° C. to 200° C., preferably in the range 50° C. to 150° C., and more preferably in the range 70° C. to 100° C. Drying step c) is advantageously carried out for a period in the range 12 to 72 h, preferably in the range 12 to 24 h. Said drying step c) is advantageously carried out in ambient air or in moist air, with a water vapour content in the range 20% to 100% by volume.

In accordance with step d) of the preparation process of the invention, the dried material obtained at the end of drying step c) undergoes a calcining step.

Said calcining step d) is advantageously carried out using techniques which are known to the skilled person. Said step d) may be carried out in air or in air with water vapour, in one or more sub-steps under predetermined temperature or gas conditions. Said calcining step d) is advantageously carried out at a temperature in the range 400° C. to 1000° C., preferably in the range 450° C. to 850° C., and more preferably in the range 500° C. to 700° C. Calcining step d) is advantageously carried out for a period in the range 1 to 6 h, preferably in the range 2 to 3 h, in ambient air or in air and water vapour. Said calcining step d) is advantageously carried out in ambient air.

Said calcining step d) can be used to generate the binder constituted by aluminium phosphate and to ensure cohesion of the hierarchical organization of fine and coarse micrometric particles of alumina and thus of the material obtained by the preparation process of the invention primarily by means of the transformation of the amorphous phase of aluminium phosphate formed after step a) of the preparation process of the invention, primarily into a cristobalite-tridymite crystalline phase. Further, the phase transformation allowing the formation of the cristobalite-tridymite crystalline phase can also be used to improve the adhesion between said micrometric alumina particles and the binder constituted by aluminium phosphate.

At the end of calcining step d) of the preparation process of the invention, the material in the form of a millimetric article of the invention is obtained. The term "material in the form of a millimetric article" means a material having dimensions of the order of a millimetre.

The material in the form of a millimetric article, preferably in the form of an extrudate, prepared using the concatenation of steps a), b), c) and d) of the preparation process of the invention may be characterized using the following techniques: nitrogen adsorption to determine the specific surface area using the BET method; mercury porosimetry for the mesoporous and macroporous volume measurements and for the pore size distribution; scanning electron microscopy (SEM) for the analysis of the microstructure to be able to observe the hierarchical organization and the dimensions of the fine and coarse micrometric alumina particles assembled together by the aluminium phosphate binder; the scanning electron microscopy (SEM) can also be coupled with EDS microanalysis (SEM-EDS) in order to visualize the location of the phosphorus; an average crush strength test to evaluate the mechanical behaviour of the material.

The preparation process of the invention provides for the formation of said material, but it also ensures the following:

good sliding of the micrometric alumina particles with respect to each other during mixing step a), which on the one hand limits degradation of the particles, and thus can maintain a high porosity in the material, and on the other hand limits the generation of micrometric defects in the mixture, thereby improving its mechanical strength;

good flow of the mixture obtained in step a) during step b), which limits the generation of geometrical defects and micrometric defects at the surface of the green material, thereby improving the appearance and mechanical strength of the material in the form of the millimetric article obtained in accordance with the invention;

the formation of defects linked to densification of the binder during steps c) and d) is minimized due to it being located in the fine space between the micrometric alumina particles, which improves the mechanical strength of the material in the form of the millimetric article obtained in accordance with the invention.

The following examples illustrate the invention without limiting its scope.

EXAMPLE 1 (In Accordance with the Invention)

Preparation of a Material Based on Alumina in the Form of a Millimetric Article, Which is Porous, with a Hierarchical Organization of Two Classes of Micrometric Particles Assembled Together by a Binder Constituted by Aluminium Phosphate with a P/Al Molar Ratio of 0.8

The population of coarse particles was constituted by alumina with reference Puralox Scfa-140 (Sasol). These particles had a BET specific surface area of 144 m$^2$/g, determined by nitrogen adsorption (ASAP 2420-Micromeritics), a mesoporous pore volume of 0.45 mL/g and a median mesopore diameter of 11.5 nm, determined by mercury porosimetry (Autopore 9500-Micromeritics). The median diameter, i.e. the Dv50 of said coarse particles, was approximately 19 μm, the Dv10 was approximately 7 μm, and the Dv90 was approximately 38 μm, determined by laser diffraction granulometry (Mastersizer 2000-Malvern).

The fine micrometric alumina particles were obtained by spray drying a boehmite sol prepared from powder with reference Pural SB3 (Sasol). The sol was prepared in a manner so as to obtain a weight ratio (mass of boehmite/mass of water)×100 of 3.4% by weight and an acid content (mass of nitric acid/mass of alumina formed from the boehmite after calcining) of 4.6% by weight. The powder with reference Pural SB3 (Sasol) was introduced into the acid solution and the mixture underwent vigorous stirring for 2 h. After the mixing time, the sol was centrifuged for 20 min at a speed of 4000 rpm in order to remove sediments of boehmite which had not been dispersed. The boehmite sol was then spray dried using a laboratory spray dryer (Büchi B-290). The spray conditions, such as supply flow rate, compressed air flow rate, inlet and outlet temperatures, and the spray flow rate were optimized in order to produce, in the separation cyclone, fine spherical particles with a median diameter of approximately 2 μm. The particles obtained by spray drying were then calcined in a muffle furnace at 600° C. for 2 h to ensure transformation of the boehmite into gamma alumina and thus of obtaining fine spherical micrometric alumina particles. After calcining, said fine particles had a BET specific surface area of 212 m$^2$/g, determined by nitrogen adsorption (ASAP 2420-Micromeritics), a mesoporous pore volume of 0.35 mL/g and a median mesopore diameter of 7.5 nm, determined by mercury porosimetry (Autopore 9500-Micromeritics). The median diameter, i.e. the Dv50 of said fine particles was approximately 1.7 μm, the Dv10 was approximately 0.75 μm, and the Dv90 was approximately 3.4 μm, determined by laser diffraction granulometry (Mastersizer 2000-Malvern).

The solid alumina precursor necessary for the formation of the binder constituted by aluminium phosphate was the powder with reference Pural SB3 (Sasol); it was a highly reactive boehmite.

The coarse micrometric particles (Puralox Scfa-140-Sasol), the fine micrometric particles obtained by spray drying a boehmite sol and the solid alumina precursor with reference Pural SB3 (Sasol) were dry mixed in order to obtain proportions of 80% and 20% by weight of coarse and fine particles respectively, and 19% by weight of solid alumina precursor. The proportions of coarse and fine particles are expressed with respect to the total quantity of micrometric particles, and the proportion of solid alumina precursor is expressed with respect to the total quantity of solid. Dry mixing was carried out using a cam blade mixer (Brabender 50 EHT) at a rotary speed of the blades of 10 rpm for 2 minutes. Next, a phosphoric acid solution was introduced using a syringe pump so as to obtain an acid ratio (mass of phosphoric acid introduced/mass of solid alumina precursor introduced)×100 of 125.4% by weight, which corresponded to a P/Al molar ratio of 0.8, where P was from the phosphoric acid and Al from the solid alumina precursor. Water was added with the acid solution in order to obtain a cohesive, homogeneous and extrudable paste. Mixing was continued at a blade rotation speed of 16 rpm for 30 minutes after addition of the acid solution was complete.

The phosphoric acid solution associated with the mechanical energy supplied during mixing allowed the micrometric agglomerates of crystallites of solid alumina precursor to be dispersed and to form a binder constituted by an amorphous aluminium phosphate phase. The high acid ratio employed also promoted the local formation of aluminium phosphate deriving from the partial dissolution of micrometric alumina particles.

The paste obtained was shaped in a step b) using a piston extruder (MTS) equipped with a cylindrical die with a 3 mm diameter and a length of 6 mm in order to form the millimetric article.

The extrudates were then dried in a ventilated oven at 80° C. for 16 h in ambient air in a step c) in order to evaporate off the solvent of the acid solution. The dried extrudates were then calcined in a muffle furnace at 600° C. for 2 h in ambient air, in a calcining step d) in order to ensure solidification of the material by transformation of the amorphous aluminium phosphate phase of the binder into crystalline cristobalite-tridymite phases.

The extrudates obtained were characterized using the following techniques: nitrogen adsorption for the determination of the BET specific surface area; mercury porosimetry for the measurements of the mesoporous and macroporous volumes and for the distribution of the mesopore diameter; by scanning electron microscopy (SEM) (JEOL JSM 6340F) for the observation of the hierarchical organization of the fine and coarse micrometric alumina particles, and in particular the distance from one interface to another between said coarse particles ($D_{coarse}$) and from one interface to another between said fine particles ($D_{fine}$) and the surface percentage of the fine ($S_{fine}$) and coarse ($S_{coarse}$) particles with respect to the total surface area of the SEM image; by SEM coupled with EDS microanalysis (SEM-EDS) in order to visualize the mapping of the phosphorus in the material and the average crush strength test (ACS) to determine the lateral crush strength of the material.

The characteristics of the material obtained with the formulation of Example 1 are recorded in Table 1.

It will be observed that the material of the invention obtained in accordance with Example 1 has good mechanical strength due to the hierarchical organization of the fine and coarse particles assembled together by a binder constituted by aluminium phosphate. The distances $D_{coarse}$ and $D_{fine}$ and the surface percentages $S_{coarse}$ and $S_{fine}$ are indispensable criteria in obtaining the hierarchical organization of said fine and coarse particles and are in agreement with those of the material of the invention. The textural properties of the material obtained are linked to the textural properties of the micrometric particles of alumina and agree with the expected properties of the material of the invention. The hierarchical organization means that the mesoporous volume of the material has been increased because of a maximization of the proportion of micrometric particles with respect to the quantity of binder.

The hierarchical organization can also be used to provide good sliding of the fine and coarse micrometric alumina particles with respect to each other, which results in a low mixing torque of the order of 3 Nm.

EXAMPLE 2 (In Accordance with the Invention)

Preparation of a Material Based on Alumina in the Form of a Millimetric Article, Which is Very Porous, with a Hierarchical Organization of Two Classes of Micrometric Particles Assembled Together by a Binder Constituted by Aluminium Phosphate with a P/Al Molar Ratio of 0.8

The coarse and porous micrometric alumina particles were obtained, starting with calcining the powder with reference Pural TH100 (Sasol) in a muffle furnace at 600° C. for 2 h in ambient air in order to transform the initial boehmite into gamma alumina. After calcining, the micrometric particles had a BET specific surface area of 142 m$^2$/g, determined by nitrogen adsorption (ASAP 2420-Micromeritics), a mesoporous pore volume of 0.87 mL/g and a median mesopore diameter of 22.5 nm, determined by mercury porosimetry (Autopore 9500-Micromeritics). The median diameter, i.e. the Dv50 of said coarse particles, was approximately 40 µm, the Dv10 was approximately 15 µm, and the Dv90 was approximately 77 µm, determined by laser diffraction granulometry (Mastersizer 2000-Malvern).

The fine micrometric alumina particles were obtained by spray drying a boehmite sol prepared from powder with reference Pural TH100 (Sasol). Said boehmite sol was prepared using the same conditions as those described in Example 1; and the spray parameters were optimized in order to produce, in the separation cyclone, fine spherical particles with a median diameter of approximately 3 µm. The particles obtained by spray drying underwent the same heat treatment as in Example 1, in order to transform the boehmite into gamma alumina and thus to obtain the fine spherical micrometric alumina particles. After calcining, these fine particles had a BET specific surface area of 130 m$^2$/g, determined by nitrogen adsorption (ASAP 2420-Micromeritics), a mesoporous pore volume of 0.78 mL/g and a median mesopore diameter of 23 nm, determined by mercury porosimetry (Autopore 9500-Micromeritics). The median diameter, i.e. the Dv50 of said coarse particles, was approximately 2.7 µm, the Dv10 was approximately 1.7 µm, and the Dv90 was approximately 8 µm, determined by laser diffraction granulometry (Mastersizer 2000-Malvern).

The solid alumina precursor necessary for the formation of the binder constituted by aluminium phosphate was the powder with reference Pural TH100 (Sasol).

The coarse micrometric particles obtained after calcining the powder with reference Pural TH100 (Sasol), the fine micrometric particles obtained by spray drying a boehmite sol and the solid alumina precursor with reference Pural TH100 (Sasol) were dry mixed in a mixing step a) in the same proportions and under the same conditions as those described in Example 1. Next, a phosphoric acid solution was introduced in the same manner as that described in Example 1 so as to obtain an acid ratio (mass of phosphoric acid introduced/mass of solid alumina precursor introduced)×100 of 125.4% by weight, which corresponded to a P/Al molar ratio of 0.8, where P was from the phosphoric acid and Al from the solid alumina precursor. Mixing was continued under the conditions described for Example 1. Water was added with the acid solution in order to obtain a cohesive, homogeneous and extrudable paste. The high acid ratio associated with the mechanical energy supplied on mixing resulted in the same technical effects as those described in Example 1.

The paste obtained was then shaped under the same conditions as those described in Example 1.

The extrudates were then dried and calcined under the same conditions as those described in Example 1; and characterized using the same techniques as those described in the same example.

The characteristics of the material obtained with the formulation of Example 2 are recorded in Table 1.

It will be observed that the material of the invention obtained in accordance with example 2 has good mechanical strength due to the hierarchical organization of the fine and coarse particles assembled together by a binder constituted by aluminium phosphate. The distances $D_{coarse}$ and $D_{fine}$ and the surface percentages $S_{coarse}$ and $S_{fine}$ are indispensable criteria in obtaining the hierarchical organization of said fine and coarse particles and are in agreement with those of the material of the invention. The textural properties of the material obtained are linked to the textural properties of the micrometric particles of alumina and agree with the expected properties of the material of the invention. The hierarchical organization means that the mesoporous volume of the material has been increased because of a maximization of the proportion of micrometric particles with respect to the quantity of binder.

The hierarchical organization can also be used to provide good sliding of the fine and coarse micrometric alumina particles with respect to each other, which results in a low mixing torque of the order of 5 Nm.

EXAMPLE 3 (In Accordance with the Invention)

Preparation of a Material Based on Alumina in the Form of a Millimetric Article, Which is Porous, with a Hierarchical Organization of Three Classes of Micrometric Particles Assembled Together by a Binder Constituted by Aluminium Phosphate with a P/Al Molar Ratio of 0.8

The coarse alumina particles were constituted by two populations of particles with distinct median diameters which were identified as follows: a population of "smaller coarse" particles with reference Puralox Scfa-140 (Sasol) and a population of "larger coarse" particles with reference Puralox SCCa 150/200 (Sasol). The characteristics of the alumina powder with reference Puralox Scfa-140 are described in Example 1. The alumina powder with reference Puralox SCCa 150/200 had a BET specific surface area of 199 m$^2$/g, determined by nitrogen adsorption (ASAP 2420-Micromeritics), a mesoporous pore volume of 0.43 mL/g and a median mesopore diameter of 8.7 nm, determined by mercury porosimetry (Autopore 9500-Micromeritics). The median diameter, i.e. the Dv50 of said coarse particles, was approximately 160 µm, the Dv10 was approximately 104 µm, and the Dv90 was approximately 247 µm, determined by laser diffraction granulometry (Mastersizer 2000-Malvern). The fine particles were obtained in the same manner as that described in Example 1 and their characteristics are also described in that example.

The solid alumina precursor was boehmite with reference Pural SB3 (Sasol), also used in Example 1.

The conditions for mixing the alumina particles with the solid alumina precursor and the acid solution, the admixing conditions, the shaping by extrusion and the heat treatments were identical to those described in Example 1, but with 4 powders instead of 3 powders. The proportions of coarse particles, i.e. the total of the smaller coarse and larger coarse particles, and of fine micrometric alumina particles were respectively 76% and 24% by weight, expressed with respect to the total quantity of micrometric particles, and the proportion of solid alumina precursor was 13% by weight with respect to the total quantity of solid. The proportion of particles known as smaller coarse particles with respect to the total number of coarse particles was 40% by weight. The acid ratio (mass of phosphoric acid introduced/mass of solid alumina precursor)×100 used was 125.4% by weight, which corresponded to a P/Al molar ratio of 0.8, where P was from the phosphoric acid and Al was from the solid alumina precursor.

The characteristics of the material obtained with the formulation of Example 3 and determined using the techniques described in Example 1 are recorded in Table 1.

It will be observed that the material of the invention obtained in accordance with Example 3 has good mechanical strength due to the hierarchical organization of the fine and coarse particles assembled together by a binder constituted by aluminium phosphate. The distance $D_{coarse}$ and $D_{fine}$ and the surface percentages $S_{coarse}$ and $S_{fine}$ are indispensable criteria in obtaining the hierarchical organization of said fine and coarse particles and are in agreement with those of the material of the invention. The textural properties of the material obtained are linked to the textural properties of the micrometric particles of alumina and agree with the expected properties of the material of the invention. The hierarchical organization means that the mesoporous volume of the material has been increased because of a maximization of the proportion of micrometric particles with respect to the quantity of binder.

The hierarchical organization can also be used to provide good sliding of the fine and coarse micrometric alumina particles with respect to each other, which results in a low mixing torque of the order of 8 Nm.

EXAMPLE 4 (Comparative)

Preparation of a Material Based on Alumina in the Form of a Millimetric Article, Which is Porous, with a Single Class of Micrometric Particles Assembled Together by a Binder Constituted by Aluminium Phosphate with a PA/l Molar Ratio of 0.8

The micrometric porous alumina particles were obtained from a powder with reference Puralox Scfa-140 (Sasol) with the characteristics described in Example 1.

The solid alumina precursor was boehmite with reference Pural SB3 (Sasol), also used in Example 1.

The conditions for mixing the alumina particles with the solid alumina precursor and the acid solution, the admixing conditions, the shaping by extrusion and the heat treatments were identical to those described in Example 1, but with 2 powders instead of 3 powders. The proportions of micrometric alumina particles and of solid alumina precursor with respect to the total quantity of solid were respectively 74% and 26% by weight. The acid ratio (mass of phosphoric acid introduced/mass of solid alumina precursor)×100 used was 125.4% by weight, which corresponded to a P/Al molar ratio of 0.8, where P was from the phosphoric acid and Al from the solid alumina precursor.

The characteristics of the material obtained with the formulation of Example 4 and determined using the techniques described in Example 1 are recorded in Table 1.

Lower mechanical strength compared with the materials of Examples 1, 2 and 3 of the invention will be observed, due to the presence of a single class of micrometric alumina particles, which also results in a smaller mesoporous volume and BET specific surface area compared with the examples of the invention. A higher macroporous volume will also be observed, due to the absence of a hierarchical organization of fine and coarse particles in this material.

Sliding of the micrometric alumina particles with respect to each other is less promoted, resulting in a mixing torque of the order of 14 Nm.

TABLE 1

| | $S_{BET}$ $(m^2/g)^a$ | $V_{mesopore}$ $(mL/g)^b$ | $V_{macropore}$ $(mL/g)^b$ | $d_{mesopore}$ $(nm)^b$ | ACS $(daN/mm)^c$ | $D_{coarse}$ $(\mu m)^d$ | $D_{fine}$ $(\mu m)^d$ | $S_{coarse}$ $(\%)^d$ | $S_{fine}$ $(\%)^d$ |
|---|---|---|---|---|---|---|---|---|---|
| Example 1 (in accordance with the invention) | 98 | 0.24 | 0.10 | 10.8 | 2.0 | 4.2 | 0.8 | 61 | 13 |
| Example 2 (in accordance with the invention) | 85 | 0.65 | 0.12 | 21.1 | 1.5 | 4.4 | 1.1 | 63 | 12 |
| Example 3 (in accordance with the invention) | 124 | 0.3 | 0.15 | 10.8 | 1.2 | 4.6 | 1.3 | 73 | 20 |
| Example 4 (comparative) | 77 | 0.20 | 0.26 | 10.8 | 0.8 | 14 | nd$^e$ | 70 | nd$^e$ |

$^a$nitrogen adsorption;
$^b$mercury porosimetry;
$^c$average crush strength test (ACS);
$^d$SEM;
$^e$not determined The examples demonstrate that the materials of Examples 1 to 3 of the invention have both a hierarchical organization of fine and coarse alumina particles and comprise a binder constituted by aluminium phosphate with a specific P/Al molar ratio, having increased mechanical properties compared with the prior art material (Example 4). The hierarchical organization also means that the mesoporous volume of the material can be increased due to maximization of the proportion of micrometric particles compared with the quantity of binder. Even better textural properties may be achieved starting from the use of high porosity micrometric alumina particles.

The invention claimed is:

1. A material in the form of a millimetric article constituted by coarse alumina particles with a median diameter in the range 10 to 200 µm, said coarse particles being at a distance, from one interface to another, of less than 10 µm, fine alumina particles with a median diameter in the range 0.5 to 10 µm, said fine particles being at a distance, from one interface to another, of less than 5 µm and being located in the space between the coarse particles, and a binder constituted by aluminium phosphate, said binder being located in the space between said fine and coarse particles, said material having a mesoporous volume, measured by mercury porosimetry, in the range 0.2 to 2 mL/g, a macroporous volume, measured by mercury porosimetry, in the range 0.05 to 0.2 mL/g and a BET specific surface area in the range 80 to 350 m²/g.

2. The material according to claim 1, in which said coarse alumina particles have a median diameter in the range 10 to 80 µm.

3. The material according to claim 1, in which said material has a grain size distribution for said coarse alumina particles in said material for which the D10 diameter is at most 3 times smaller than the median diameter D50 and for which the D90 diameter is at most 3 times higher than the median diameter D50.

4. The material according to claim 1, in which said coarse particles have a median diameter of less than ⅒th the mean diameter of the smallest dimension of the material.

5. The material according to claim 1, in which said coarse particles are at a distance from one interface to another by less than 6 µm.

6. The material according to claim 1, in which said coarse particles comprise a proportion of particles termed smaller coarse particles with a median diameter in the range 10 to 60 µm and a proportion of particles termed larger coarse particles with a median diameter in the range 60 to 200 µm.

7. The material according to claim 6, in which said material has a grain size distribution of said smaller coarse particles in said material for which the D10 diameter is at most 3 times smaller than the median diameter D50 and for which the D90 diameter is at most 3 times higher than the median diameter D50 and a grain size distribution of said larger coarse particles in said material for which the D10 diameter is at most 3 times smaller than the median diameter D50 and for which the D90 diameter is at most 3 times higher than the median diameter D50.

8. The material according to claim 1, in which said fine particles have a median diameter in the range 0.5 to 3 µm.

9. The material according to claim 1, in which said material has a grain size distribution of said fine alumina particles in said material for which the D10 diameter is at most 3 times smaller than the median diameter D50 and for which the D90 diameter is at most 3 times higher than the median diameter D50.

10. The material according to claim 1, in which said fine particles have a median diameter which is less than ⅕th the median diameter of the coarse particles.

11. The material according to claim 1, in which the surface percentage of the fine particles is in the range 5% to 55% with respect to the total surface area of the SEM image of said material.

12. The material according to claim 1, in which the surface percentage of the coarse particles is in the range 35% to 85% with respect to the total surface area of the SEM image of said material.

13. A process for the preparation of a material according to claim 1, comprising at least the following steps:
  a) mixing 10% to 60% by weight of fine alumina particles with a median diameter in the range 0.5 to 10 µm and 40% to 90% by weight of coarse alumina particles with a median diameter in the range 10 to 200 µm, 5% to 50% by weight of a solid alumina precursor, the percentages of the fine and coarse particles of alumina being expressed with respect to the total quantity of micrometric particles, and the percentage of solid alumina precursor being expressed with respect to the total quantity of solid, and phosphoric acid in solution in proportions such that the P/Al molar ratio is in the range 0.2 to 1.2, said coarse particles and fine particles of alumina, designated by the term micrometric particles, having a mesoporous volume in the range 0.2 to 2.5 mL/g, and a median mesopore diameter in the range 7 to 25 nm;

b) shaping the mixture obtained from step a);

c) drying the green material obtained at the end of step b); and d) calcining the dried material obtained from step c).

14. The process according to claim 13, in which said solid alumina precursor is selected from aluminium oxides, aluminium hydroxides and aluminium oxyhydroxides which are soluble or dispersible in the phosphoric acid solution.

15. The process according to claim 13, in which said P/Al ratio is in the range 0.4 to 1.0.

16. The process according to claim 13, in which said shaping step b) is carried out by granulation or extrusion.

* * * * *